United States Patent
Ueda et al.

(10) Patent No.: US 7,140,171 B2
(45) Date of Patent: *Nov. 28, 2006

(54) MATERIAL FOR GLAND PACKING AND THE GLAND PACKING

(75) Inventors: Takahisa Ueda, Osaka (JP); Masaru Fujiwara, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/527,625

(22) PCT Filed: Sep. 9, 2003

(86) PCT No.: PCT/JP03/11504

§ 371 (c)(1),
(2), (4) Date: Mar. 10, 2005

(87) PCT Pub. No.: WO2004/025151

PCT Pub. Date: Mar. 25, 2004

(65) Prior Publication Data

US 2006/0026944 A1   Feb. 9, 2006

(30) Foreign Application Priority Data

Sep. 11, 2002 (JP) ............... 2002-265877
Sep. 11, 2002 (JP) ............... 2002-265878
Sep. 11, 2002 (JP) ............... 2002-265879
Sep. 11, 2002 (JP) ............... 2002-265880

(51) Int. Cl.
   *D02G 3/06* (2006.01)

(52) U.S. Cl. ............... 57/235
(58) Field of Classification Search ........... 57/210, 57/212, 229, 235, 260
See application file for complete search history.

(56) References Cited

U.S. PATENT DOCUMENTS

| 5,549,306 | A * | 8/1996 | Ueda ............... 277/537 |
| 6,502,382 | B1 * | 1/2003 | Fujiwara et al. ....... 57/200 |
| 6,708,479 | B1 * | 3/2004 | Fujiwara et al. ....... 57/200 |
| 2002/0069635 | A1 | 6/2002 | Tsukamoto |
| 2003/0070413 | A1 * | 4/2003 | Fujiwara et al. ....... 57/210 |

FOREIGN PATENT DOCUMENTS

| EP | 1 179 698 | 2/2002 |
| EP | 1 193 428 | 4/2002 |
| GB | 2 285 067 | 6/1995 |
| JP | 3-249482 | 11/1991 |
| JP | 5-118444 | 5/1993 |
| JP | 10-132086 | 5/1998 |

* cited by examiner

Primary Examiner—Shaun R. Hurley
(74) Attorney, Agent, or Firm—Koda & Androlia

(57) ABSTRACT

A material for gland packing including a sheet-like reinforcing member configured by a fibrous material disposed at least on one face of a strip-like expanded graphite to form a strip-like base member. The base member is stranded to be formed as a cord-like member. Then, the outer side of the cord-like member is covered by a portion of the reinforcing member, and the remaining portion of the reinforcing member is involved in the cord-like member. A large number of openings are formed in the reinforcing member, and a strip-like expanded graphite faces the openings engages with the openings.

12 Claims, 17 Drawing Sheets

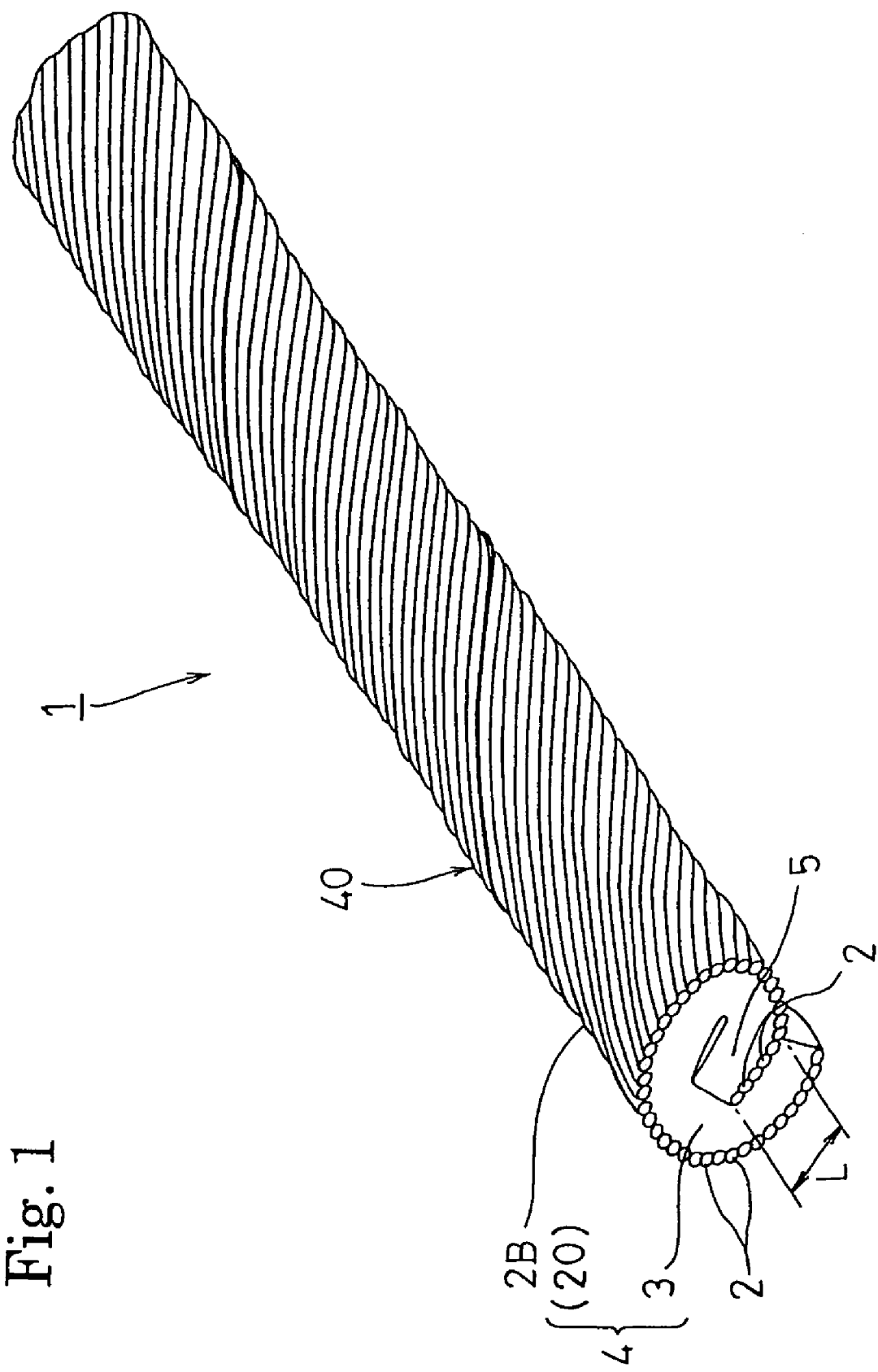

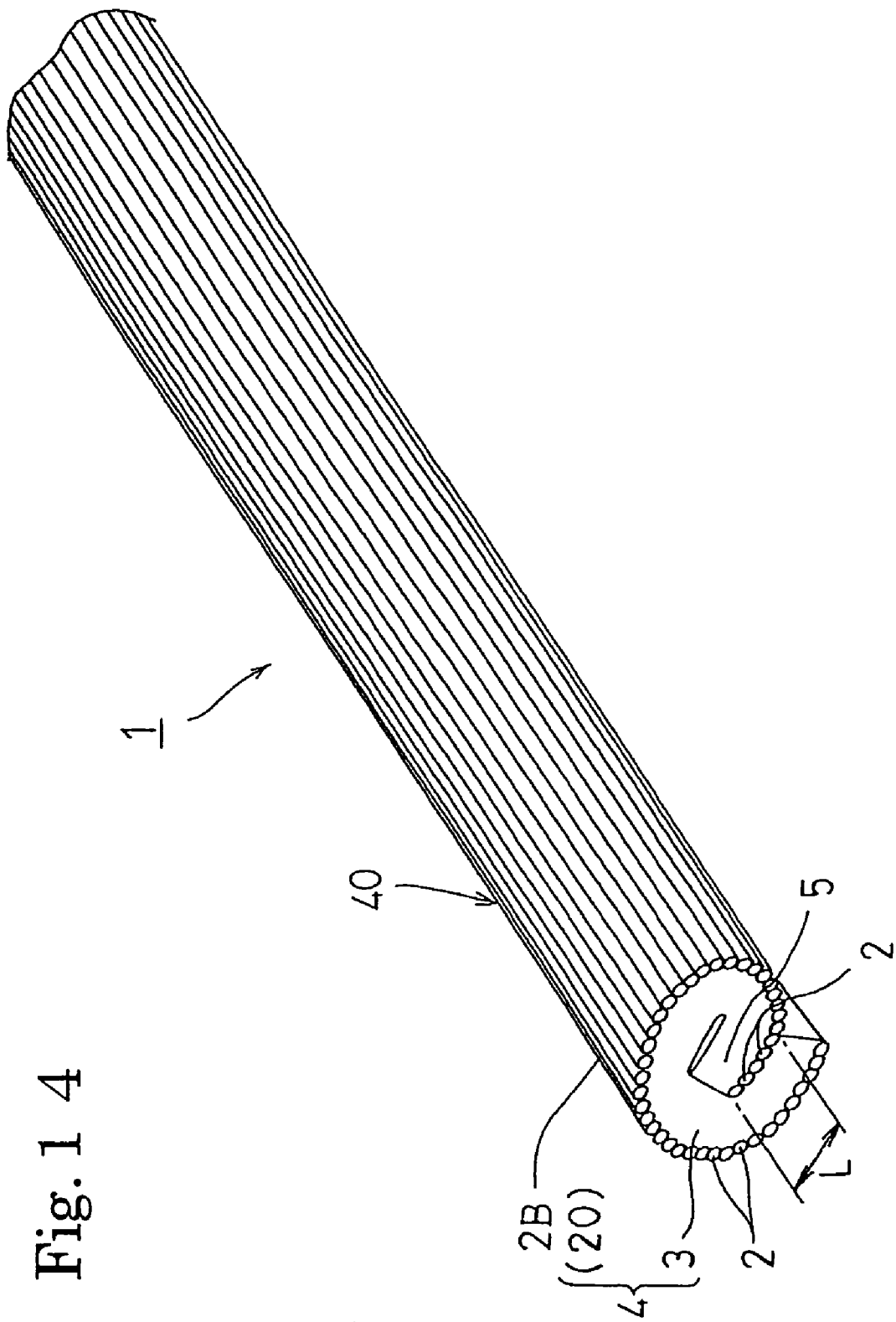

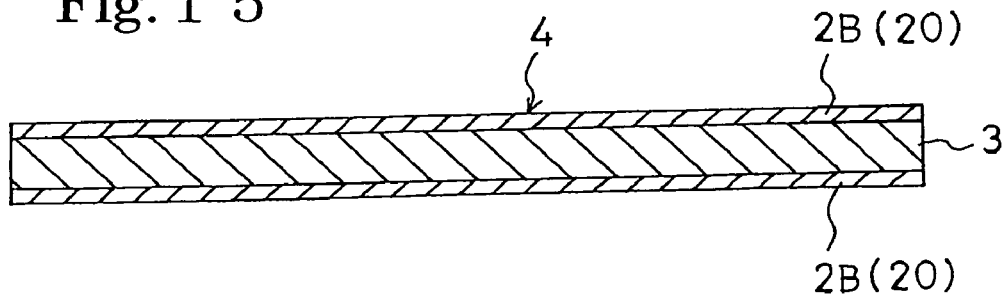
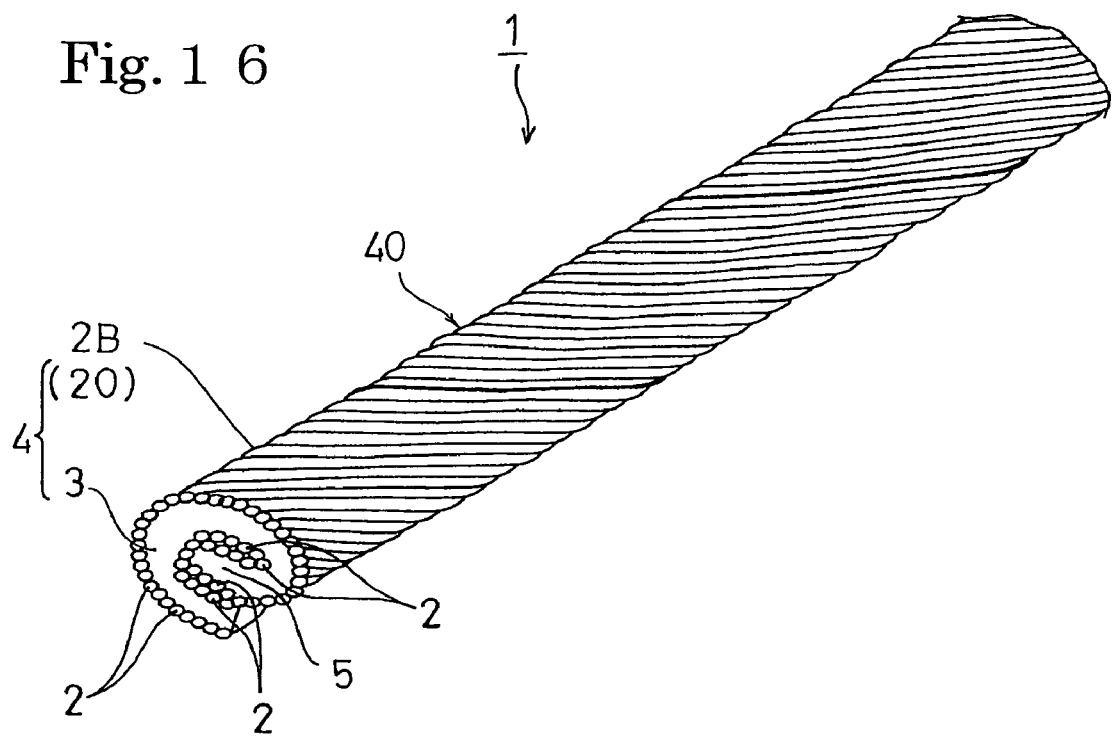

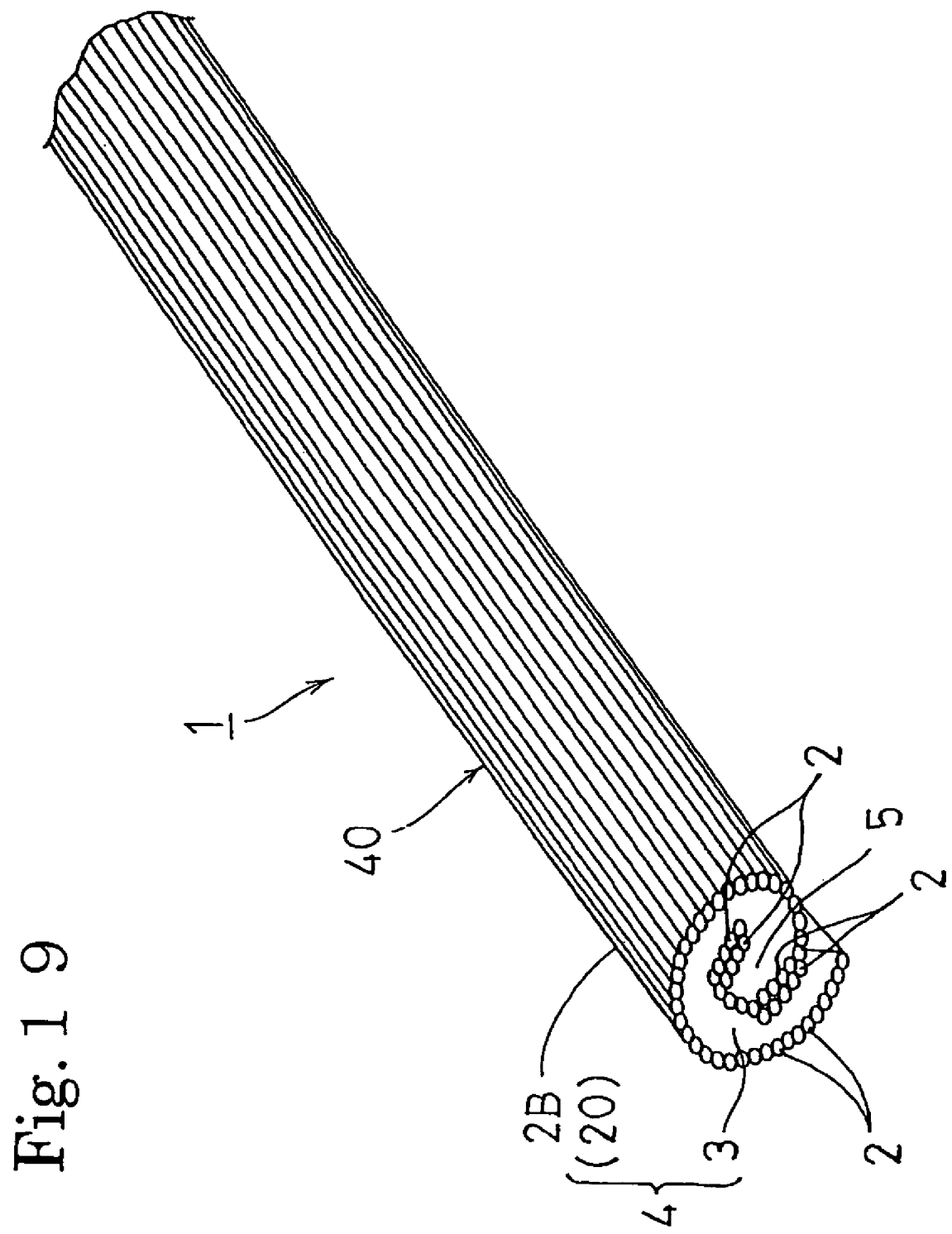

MATERIAL FOR GLAND PACKING AND THE GLAND PACKING

TECHNICAL FIELD

The present invention relates to a gland packing material which is useful in production of a gland packing, and also to a gland packing which is produced by the gland packing material.

BACKGROUND ART

Conventionally, as a gland packing material which is useful in production of a gland packing, for example, known are a material disclosed in Japanese Patent Publication No. 6-27546 (hereinafter, referred to as conventional art 1), and that disclosed in Japanese Patent No. 2,583,176 (hereinafter, referred to as conventional art 2).

In conventional art 1 above, as shown in FIG. 22, an expanded graphite tape (51) is folded along longitudinal fold lines to form a cord-like member (52), and the cord-like member (52) is covered by a reinforcing member (53) configured by a knitted or braided member of metal wires such as stainless steel, inconel, or monel, thereby forming a gland packing material (50).

In conventional art 2 above, as shown in FIG. 23, a cord-like member (52) of an expanded graphite tape (51) is covered by a reinforcing member (53) configured by a knitted or braided member of metal wires, and the resulting member is folded to a V-like shape along a longitudinal fold line, thereby forming a gland packing material (50).

In both the gland packing materials (50) of the conventional art, the outside of the cord-like member (52) is reinforced by the reinforcing member (53) configured by a braided member of metal wires or the like (hereinafter, such reinforcement is referred to as external reinforcement). Therefore, the gland packing materials (50) are provided with high tensile strength. Consequently, a plurality of such gland packing materials (50) are bundled, and then subjected to a braiding or twisting process, so that a gland packing can be produced. In conventional art 1 above, when eight gland packing materials (50) are bundled and an eight-strand square-knitting process is conducted, for example, a gland packing (54) which is braided as shown in FIG. 24 is produced, and, when six gland packing materials (50) are bundled and a twisting process is conducted, a gland packing (54) which is twisted as shown in FIG. 25 is produced. In conventional art 2 above, when eight gland packing materials (50) are bundled and an eight-strand square-knitting process is conducted, for example, a gland packing (54) which is braided as shown in FIG. 26 is produced, and, when six gland packing materials (50) are bundled and a twisting process is conducted, a gland packing (54) which is twisted as shown in FIG. 27 is produced.

Each of the conventional gland packings (54) is provided by the expanded graphite tape (51) with properties which are preferable in sealing, and which are inevitable in a packing, such as the heat resistance, the compressibility, and the recovery property, and hence can seal a shaft seal part of a fluid apparatus while producing a high sealing property. Furthermore, metal wires have high bendability, and hence can cope with not only production of a gland packing (54) having a large diameter, but also that of a gland packing (54) having a small diameter, and has advantages such as excellent durability.

In order to produce any one of the conventional gland packing materials (50), however, knitting or other braiding of metal wires must be conducted by a knitting machine or a braiding machine. At this time, metal wires are subjected to braiding or the like by a knitting or braiding machine having a complicated structure. Therefore, high-speed production is hardly conducted, and the productivity is poor. Consequently, these gland packing materials (50) have problems in that their costs are high, and also the cost of the gland packing (54) is high. Moreover, the gland packing materials (50) have a poor shape-retaining property, thereby causing a possibility that expanded graphite may drop off during the braiding to lower the sealing property.

In the gland packing materials (50), the outer portion is reinforced by the knitted or braided member of metal wires. In the gland packing (54) which is produced by such a gland packing material (50), therefore, the reinforcing member (53) configured by a knitted or braided member of metal wires is in sliding contact with components of a fluid apparatus such as a pump shaft or a valve rod which rotates or axially slides, i.e., a counter member. At this time, there is a problem in that the reinforcing member (53) easily damages the counter member. Moreover, the reinforcing member (53) exhibits a high sliding resistance, and hence there is another problem in that the rotation performance or axial sliding performance of the counter member is lowered.

In order to solve these problems, it may be contemplated to use carbon fibers, and brittle fibers such as economical glass fibers, silica fibers, and ceramic fibers such as alumina and alumina-silica, as a reinforcing member which covers the cord-like member (52) of the expanded graphite tape (51) to apply external reinforcement. These carbon fibers and other brittle fibers can sufficiently withstand a braiding or twisting process in production of the gland packing (54), and has properties that, even when stranded, they are hardly broken.

In the case where the gland packing (54) is produced by the gland packing material (50) which is reinforced by such carbon fibers or brittle fibers, when a shaft seal part of a fluid-apparatus is sealed by the gland packing (54), it is expected that the counter member is not damaged, the sliding resistance is suppressed to a low level, the rotation performance or axial sliding performance of the counter member is improved, and the heat resistance is enhanced. In the case where economical brittle fibers such as glass fibers are used, particularly, it is expected to reduce the costs of the gland packing material (50) and the gland packing (54).

Unlike metal wires, however, carbon fibers and brittle fibers are low in toughness. Even when knitting or other braiding for externally reinforcing the expanded graphite tape (51) is tried, therefore, such fibers are broken. Consequently, it has been impossible to obtain the gland packing material (50) in which the expanded graphite tape (51) is externally reinforced by a reinforcing member configured by carbon fibers or brittle fibers.

The invention has been developed in view of the above-described circumstances. It is an object of the invention to provide a gland packing material having an external reinforcement structure which can be economically provided by improving the productivity, and the shape-retaining property is improved to enhance the sealing property, and a gland packing which is produced with using the gland packing material.

It is another object of the invention to enable external reinforcement by carbon fibers, whereby a counter member is prevented from being damaged in sealing, the sliding resistance is suppressed to a low level, and the heat resistance is enhanced.

It is a further object of the invention to enable external reinforcement by brittle fibers, thereby providing an economical gland packing material having an external reinforcement structure, and an economical gland packing which is produced with using the gland packing material.

It is a still further object of the invention to cope with production of gland packings in a wide range from a large diameter to a small diameter, and maintain an advantage of high durability.

DISCLOSURE OF THE INVENTION

In order to attain the objects, for example, the invention is configured in the manner which will be described with reference to FIGS. 1 to 21 showing embodiments of the invention.

Namely, the invention relates to a gland packing material, and is characterized in that the material is configured by a cord-like member (40) which is formed by stranding a strip-like base member (4), or winding a strip-like base member (4) about a longitudinal direction, or winding a strip-like base member (4) about a longitudinal direction and then stranding the base member, the base member (4) comprises: a sheet-like reinforcing member (20) configured by a fibrous material (2); and a strip-like expanded graphite (3), the reinforcing member (20) is disposed at least on one face of the strip-like expanded graphite (3), a portion of the reinforcing member (20) is placed outside the cord-like member (40), a remaining portion is involved in the cord-like member (40), a large number of openings (20A) are formed in the reinforcing member (20), and the strip-like expanded graphite (3) faces the openings (20A).

The invention relates also to a gland packing, and is characterized in that a plurality of the gland packings (1) are used, and braided or twisted.

According to the configuration, the invention has the following advantages.

In the cord-like member, a portion of the sheet-like reinforcing member configured by the fibrous material is placed on the outer face, and surely reinforced by the reinforcing member. Moreover, the many openings are formed in the reinforcing member, and the strip-like expanded graphite faces the openings. Therefore, a so-called anchor effect in which the expanded graphite is engaged with the openings is produced. Because of the anchor effect, the coupling force between the strip-like expanded graphite and the reinforcing member is enhanced. Even when a used amount of an adhesive agent for coupling the strip-like expanded graphite with the reinforcing member is restricted to zero or a very small amount, therefore, the reinforcing member is hardly separated from the strip-like expanded graphite during braiding or a twisting process of producing a gland packing, and the external reinforcement effect due to the reinforcing member can be effectively exerted.

Since the used amount of the adhesive agent can be restricted to zero or a very small amount, it is possible to suppress the properties of the strip-like expanded graphite such as the affinity and the compression recovery property from being lowered by hardening of the adhesive agent. Even when a gland packing using the gland packing material is used under a high temperature condition, reduction of the sealing property due to burning of the adhesive agent can be prevented from occurring.

The strip-like expanded graphite has properties which are preferable in sealing, and which are inevitable in a packing, such as the heat resistance, the compressibility, and the recovery property, and the gland packing can seal a shaft seal part of a fluid apparatus while producing a high sealing property. Since the reinforcing member is involved in the cord-like member, a sandwich structure in which a portion of the strip-like expanded graphite is sandwiched by the reinforcing member is formed, so that, in the case where the packing is compressed or a pressure is applied to the packing, movement of expanded graphite particles is suppressed. In a gland packing produced by the gland packing material, when the packing is compressed or a pressure is applied to the packing, therefore, the amount by which expanded graphite particles protrude from the gland packing material can be suppressed. As a result, the sealing face pressure of the gland packing is prevented from being lowered, so that the pressure resistance performance can be improved, and the pressure contact force to be applied to the counter member is increased, so that the sealing property can be improved.

The reinforcing member is placed outside the cord-like member by stranding the base member, or winding the base member about the longitudinal direction, or winding and then stranding the base member. Unlike the conventional arts described above, therefore, an external reinforcement structure can be easily produced without conducting braiding or the like on a fibrous material. Consequently, the productivity is improved, and hence it is possible to provide an economical gland packing material and a gland packing configured by the gland packing material.

In the cord-like member, a portion of the outer side may be covered by the reinforcing member. When a whole outside of the cord-like member is covered by the reinforcing member, however, the external reinforcement effect is exerted more effectively. Therefore, this is more preferable.

In the case where the fibrous material is carbon fibers or other brittle fibers, when the base member is stranded or wound and then stranded, bent portions are produced in the fibrous material. When the bent portions are exposed from a surface of the cord-like member, the bent portions exposed from the surface are tangled with one another during braiding or a twisting process of producing a gland packing, to suppress relative slippage of the gland packing material, whereby the shape-retaining property of the gland packing can be enhanced.

The reinforcing member may be disposed only on one face of the strip-like expanded graphite. Alternatively, the reinforcing member may be disposed on both faces of the strip-like expanded graphite. In the case where the reinforcing member is disposed on both the faces of the strip-like expanded graphite, an involved amount of the reinforcing member which is involved in the cord-like member is increased, and the cord-like member can be strongly reinforced also from the inner side. Therefore, the tensile strength of the gland packing material is further enhanced. Since the reinforcing member configured by the fibrous material is placed on both the faces of the strip-like expanded graphite and the involved amount of the reinforcing member is increased, movement of expanded graphite particles is satisfactorily suppressed, so that the shape-retaining property of the gland packing material is improved. As a result, in a gland packing which is produced by the gland packing material, the pressure contact force to be applied to the counter member can be further increased.

For example, the sheet-like reinforcing member configured by a fibrous material may be configured by a fiber-opened sheet in which multifilament yarns are opened in a sheet-like shape.

In this case, a thickness of the fiber-opened sheet is preferably set to 10 μm to 300 μm, and more preferably to 30 μm to 100 μm. According to the configuration, the fiber-opened sheet can be easily produced, the sheet can be easily stranded, so that the external reinforcement effect can be enhanced, and leakage from a reinforcing member portion can be prevented from occurring.

As the fibrous material, one or two or more selected from the group consisting of carbon fibers and other brittle fibers, and tough fibers may be used. These fibrous materials exert a higher sealing property as the thickness of one fiber is smaller. When each fiber is excessively thin, the fibrous material may be broken during a stranding process, and, when each fiber is excessively thick, the fibrous material is hardly stranded. Therefore, the diameter of each fiber is preferably 3 μm to 15 μm, and more preferably in a range of 5 μm to 9 μm.

In the case where carbon fibers or brittle fibers are used as the fibrous material, as compared with the conventional art in which the reinforcing member is configured by conducting a braiding process or the like on metal wires, there is no fear that the gland packing forms a large scratch on a counter member, and the sliding resistance is so low that the rotation performance or axial sliding performance of the counter member can be improved, and an excellent heat resistance can be attained. In the case where carbon fibers are used, particularly, these performances can be exerted more satisfactorily. In the case where other brittle fibers are used, the invention can be economically implemented.

Specific examples of the brittle fibers are glass fibers, silica fibers, and ceramic fibers such as alumina and alumina-silica. One or two or more selected from the group consisting of these fibers can be used.

In the case where tough fibers are used as the fibrous material, the fibrous material can be easily produced with using thin fibers because the fibers have high bendability and exert excellent workability. An economical gland packing material can be provided because the fibers have high productivity. When such a gland packing material is used, not only a gland packing having a large diameter, but also a gland packing having a small diameter can be easily produced, and moreover it is possible to produce a gland packing which has high durability, and which is economical.

Specific examples of the tough fibers are metal fibers, aramid fibers, and PBO (poly-p-phenylenebenzobisoxazole) fibers. One or two or more selected from the group consisting of these fibers can be used.

BRIEF DESCRIPTION OF THE DRAWINGS

FIGS. 1 to 21 show embodiments of the invention.

FIGS. 1 to 7 show a first embodiment of the gland packing material of the invention, FIG. 1 is a perspective view of the gland packing material, FIG. 2 is a partial enlarged plan view showing a state where strip-like expanded graphite faces many openings of a reinforcing member configured by a fibrous material, FIG. 3 is a section view taken along the line A—A in FIG. 2, FIG. 4 is an enlarged view illustrating bent portions of the fibrous material, FIG. 5 is a perspective view showing a fiber bundle, FIG. 6 is a perspective view showing a fiber-opened sheet, and FIG. 7 is a perspective view of a base member.

FIG. 8 is a perspective view of strip-like expanded graphite in a state where a small amount of adhesive agent is used, and showing a modification of a procedure of producing the base member.

FIGS. 9 and 10 show another modification of the procedure of producing the base member, FIG. 9 is a section view showing a state where expanded graphite powder is superimposed on a fiber-opened sheet, and FIG. 10 is a section view of the base member.

FIGS. 11 to 13 show modifications of the base member in the first embodiment, FIG. 11 is a section view of a base member in a first modification, FIG. 12 is a section view of a base member in a second modification, and FIG. 13 is a section view of a base member in a third modification.

FIG. 14 is a perspective view showing a second embodiment of the gland packing material of the invention.

FIGS. 15 and 16 show a third embodiment of the gland packing material of the invention, FIG. 15 is a section view of a base member, and FIG. 16 is a perspective view of the gland packing material.

FIGS. 17 and 18 show modifications of the base member in the third embodiment, FIG. 17 is a section view of a base member in a first modification, and FIG. 18 is a section view of a base member in a second modification.

FIG. 19 is a perspective view showing a fourth embodiment of the gland packing material of the invention.

FIG. 20 is a perspective view showing an embodiment of the gland packing of the invention.

FIG. 21 is a perspective view showing another embodiment of the gland packing of the invention.

FIG. 22 is a perspective view of a gland packing material of conventional art 1, and FIG. 23 is a perspective view of a gland packing material of conventional art 2.

FIG. 24 is a perspective view of a gland packing which is formed by braiding the gland packing material of conventional art 1, and FIG. 25 is a perspective view of a gland packing which is formed by twisting the gland packing material of conventional art 1.

FIG. 26 is a perspective view of a gland packing which is formed by braiding the gland packing material of conventional art 2, and FIG. 27 is a perspective view of a gland packing which is formed by twisting the gland packing material of conventional art 2.

BEST MODE FOR CARRYING OUT THE INVENTION

Hereinafter, preferred embodiments of the invention will be described with reference to the drawings.

Figure 1:
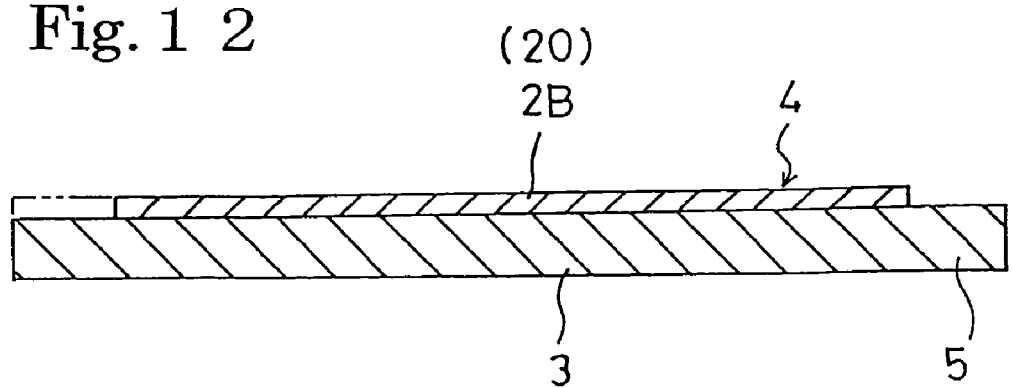
Figure 1:
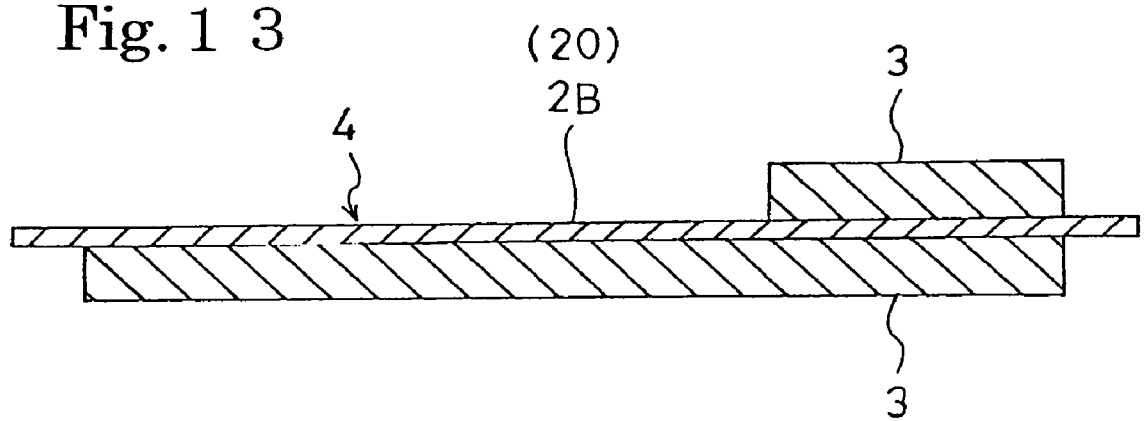
Figure 1:
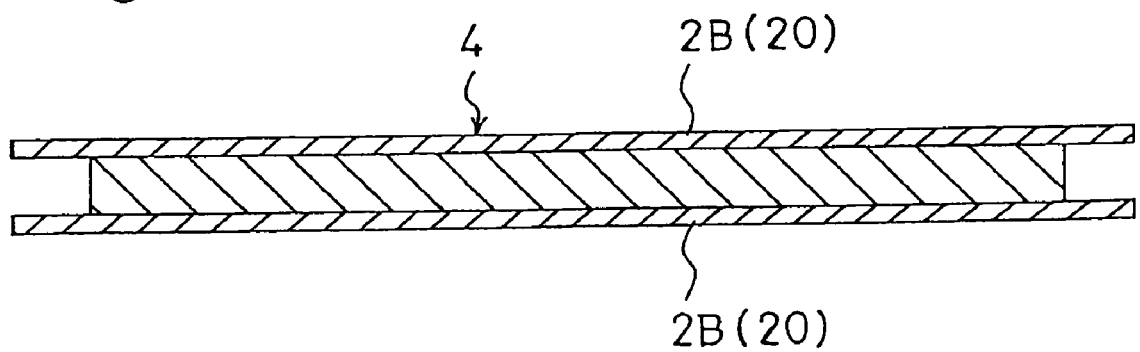
Figure 1:
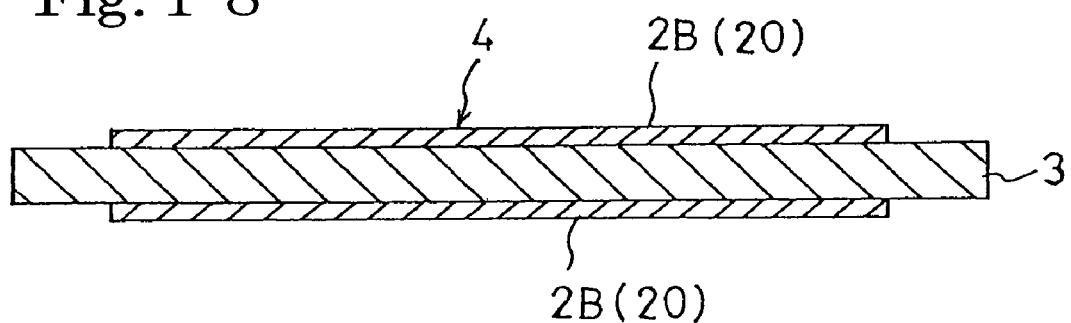

FIG. 1 is a perspective view showing a first embodiment of the gland packing material of the invention. Referring to the figure, the gland packing material (1) is configured by a cord-like member (40) which is formed by sequentially stranding a strip-like base member (4) in the longitudinal direction with starting from an end. The base member (4) comprises: a sheet-like reinforcing member (20) configured by many long carbon fibers (2) which are very thin; and a strip-like expanded graphite (3). The reinforcing member (20) is disposed on one face of the strip-like expanded graphite (3). The stranding process is applied so that the reinforcing member (20) is directed outward. Therefore, the cord-like member (40) is in the state where the strip-like expanded graphite (3) is covered by the reinforcing member (20). The stranding process is applied so that a portion of the reinforcing member (20) is involved in the cord-like member (40). As shown in FIG. 1, namely, a portion of the carbon fibers (2) and one end portion (5) in the width direction of the strip-like expanded graphite (3) are involved in the gland packing material (1). Therefore, the one end portion (5) of the strip-like expanded graphite (3) has a sandwich structure in which the range indicated by a region (L) is sandwiched by the reinforcing member (20). Consequently, the gland packing material (1) is configured to have an external reinforcement structure in which the reinforcing member (20) configured by the carbon fibers (2) is placed over the whole outer peripheral surface, and a portion of the reinforcing member (20) is interposed between the strip-like expanded graphite (3).

Figure 2:
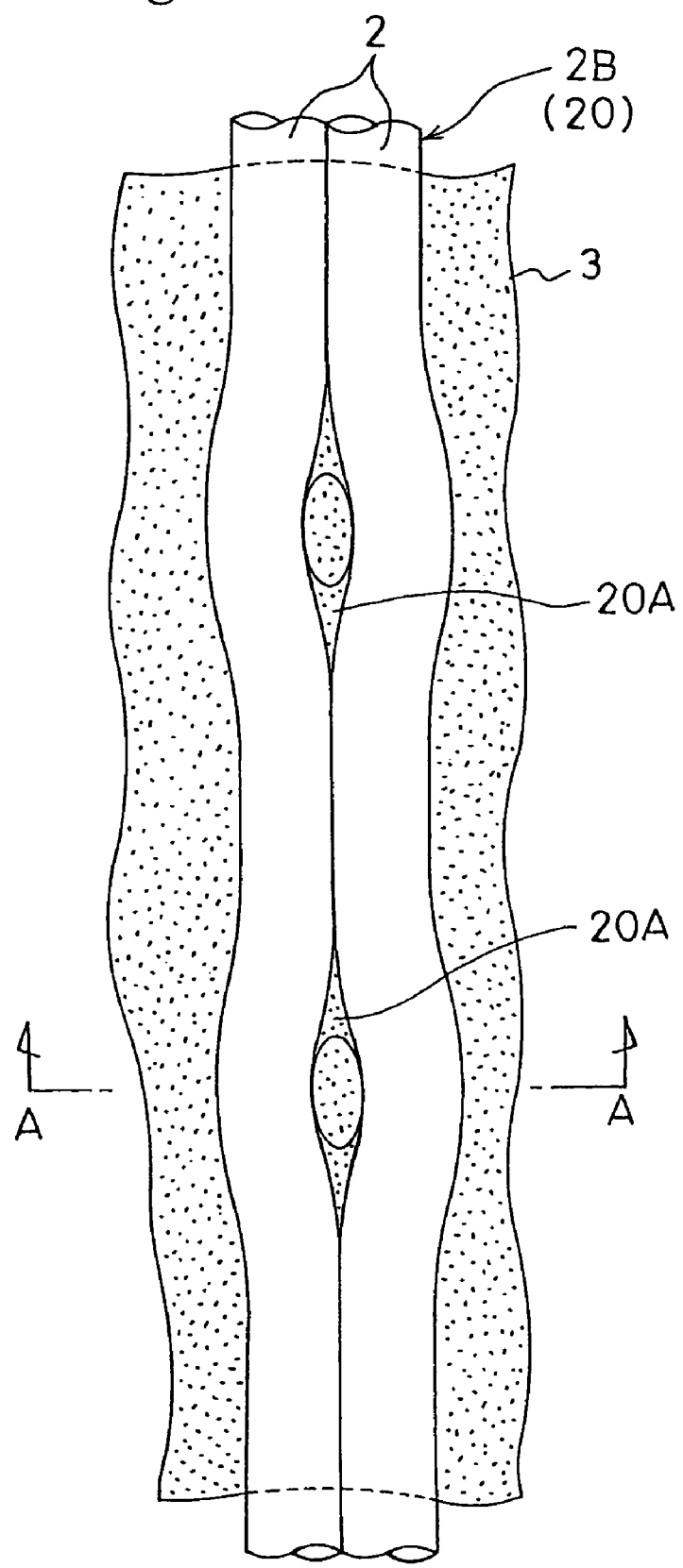
Figure 3:
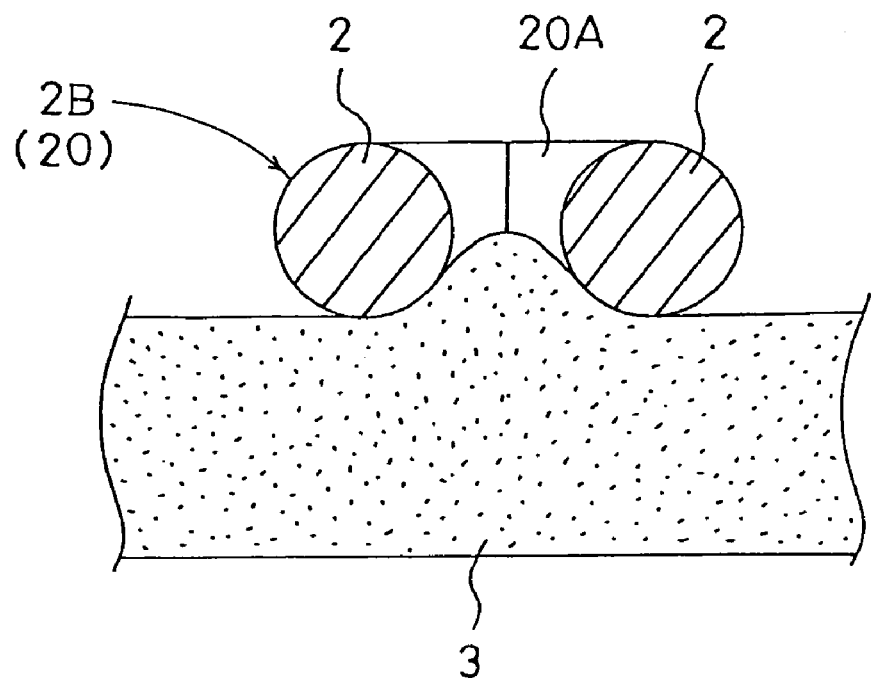

As shown in FIGS. 2 and 3, the reinforcing member (20) comprises a large number of openings (20A), and the strip-like expanded graphite (3) faces the openings (20A). The many openings (20A) are formed in a case where the openings are spontaneously formed when the reinforcing member (20) configured by many long carbon fibers (2) which are very thin are stranded, or a case where many portions of the reinforcing member (20) are slightly forcedly torn in such a manner that adjacent carbon fibers (2) are separated from each other, and local clefts are previously formed in an artificial manner before the stranding process.

The carbon fibers (2) have a property that they are hardly broken by an external force of the level of stranding. Therefore, it is possible to obtain the gland packing material (1) having an external reinforcement structure in which the strip-like expanded graphite (3) is covered by the reinforcing member (20) configured by the carbon fibers (2). Furthermore, the strip-like expanded graphite (3) faces the many openings (20A) formed in the reinforcing member (20) configured by the carbon fibers (2), and the expanded graphite (3) is engaged with the openings (20A) to produce a so-called anchor effect. Because of the anchor effect, the coupling force between the strip-like expanded graphite (3) and the reinforcing member (20) is enhanced, and hence the use of an adhesive agent can be omitted. In a process in which the gland packing material (1) is braided or twisted in order to produce a gland packing, namely, the reinforcing member (20) is hardly separated from the strip-like expanded graphite (3) even when an adhesive agent is not used. Therefore, the external reinforcement effect due to the reinforcing member (20) can be effectively exerted. The omission of the use of an adhesive agent suppresses the properties of the strip-like expanded graphite (3) such as the affinity and the compression recovery property from being lowered by hardening of the adhesive agent. Moreover, the portion of the carbon fibers (2) and the one end portion (5) in the width direction of the strip-like expanded graphite (3) are involved in the gland packing material (1). Therefore, the sandwich structure in which the one end portion (5) of the strip-like expanded graphite (3) is sandwiched by the reinforcing member (20) is formed, so that, when the packing is compressed or a pressure is applied to the packing, movement of expanded graphite particles is suppressed. In a gland packing produced by the gland packing material (1), when the packing is compressed or a pressure is applied to the packing, therefore, the amount by which expanded graphite particles protrude from the gland packing material (1) can be suppressed. As a result, the sealing face pressure is prevented from being lowered, so that the pressure resistance performance can be improved, and the pressure contact force to be applied to the counter member is increased, so that also the sealing property can be improved.

In the gland packing material (1), it is requested only to apply stranding so as to attain a state where a portion of the base member (4) is involved, and an external reinforcement structure can be easily configured. As compared with the production of the conventional gland packing material (50) in which an external reinforcement structure is configured by a knitted or braided member of metal wires, therefore, the production workability is improved, and the material can be economically produced.

Figure 4:
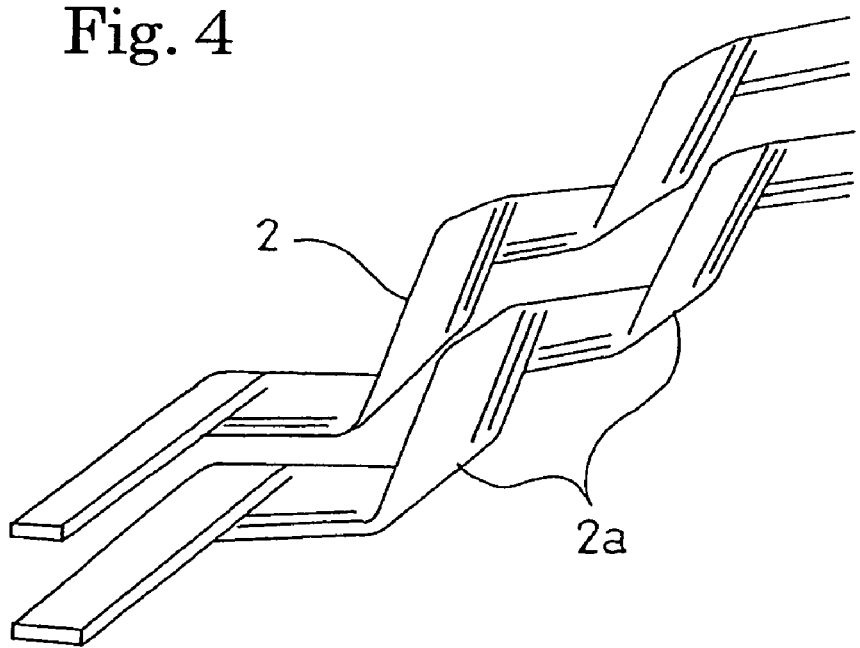

When the base member (4) is stranded, as shown in FIG. 4, bent portions (2a) are randomly formed in the carbon fibers (2), and the bent portions (2a) are exposed from the surface of the cord-like member (40). During braiding or a twisting process of producing a gland packing which will be described later, therefore, the bent portions (2a) which are randomly exposed from the surface of the cord-like member (40) are tangled with one another to suppress relative slippage of the gland packing material (1), whereby the shape-retaining property of the gland packing can be enhanced.

For example, the gland packing material (1) can be produced in the following procedure.

First, the base member (4) is formed in the following procedure.

Figure 5:
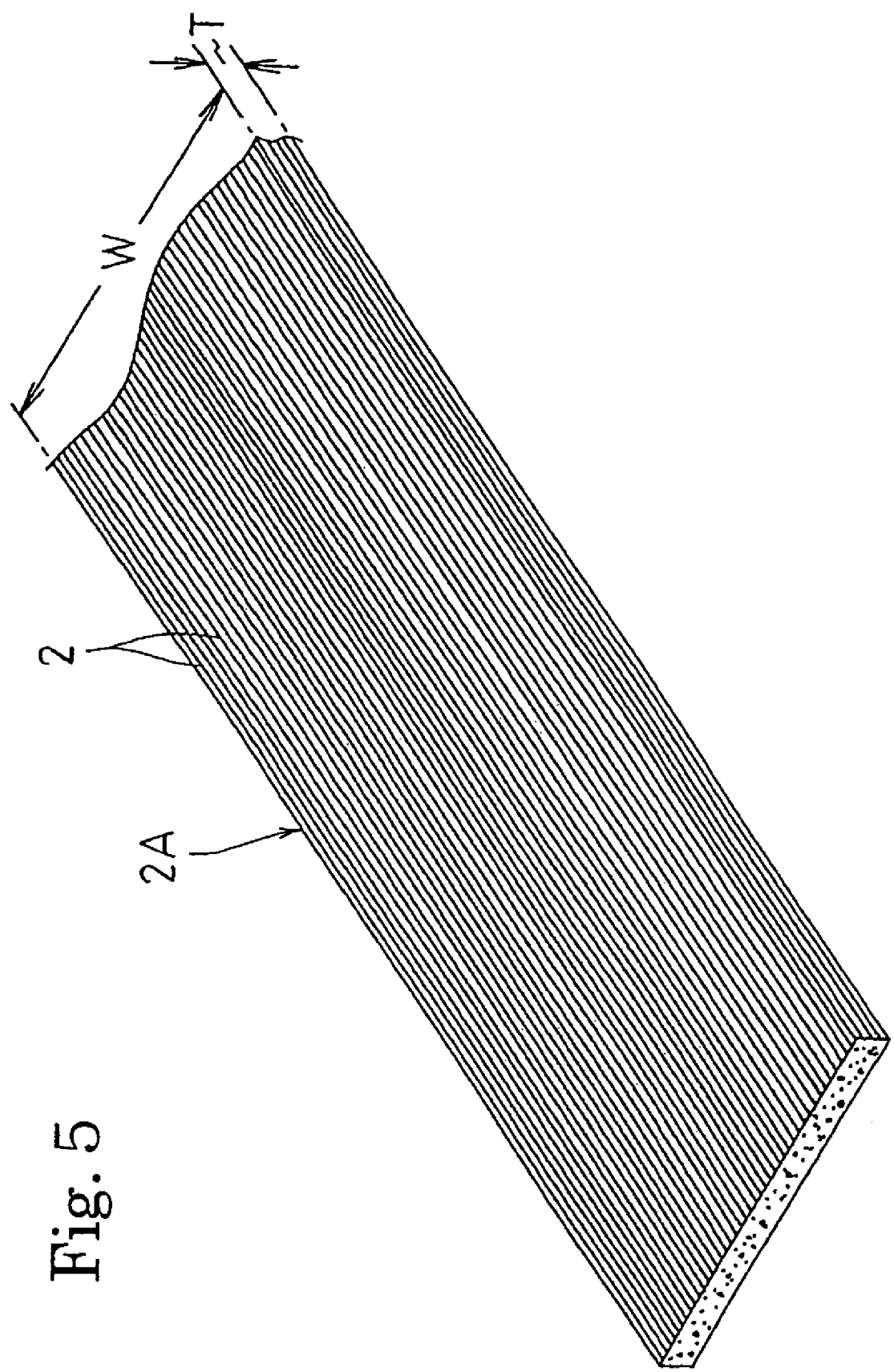
Figure 6:
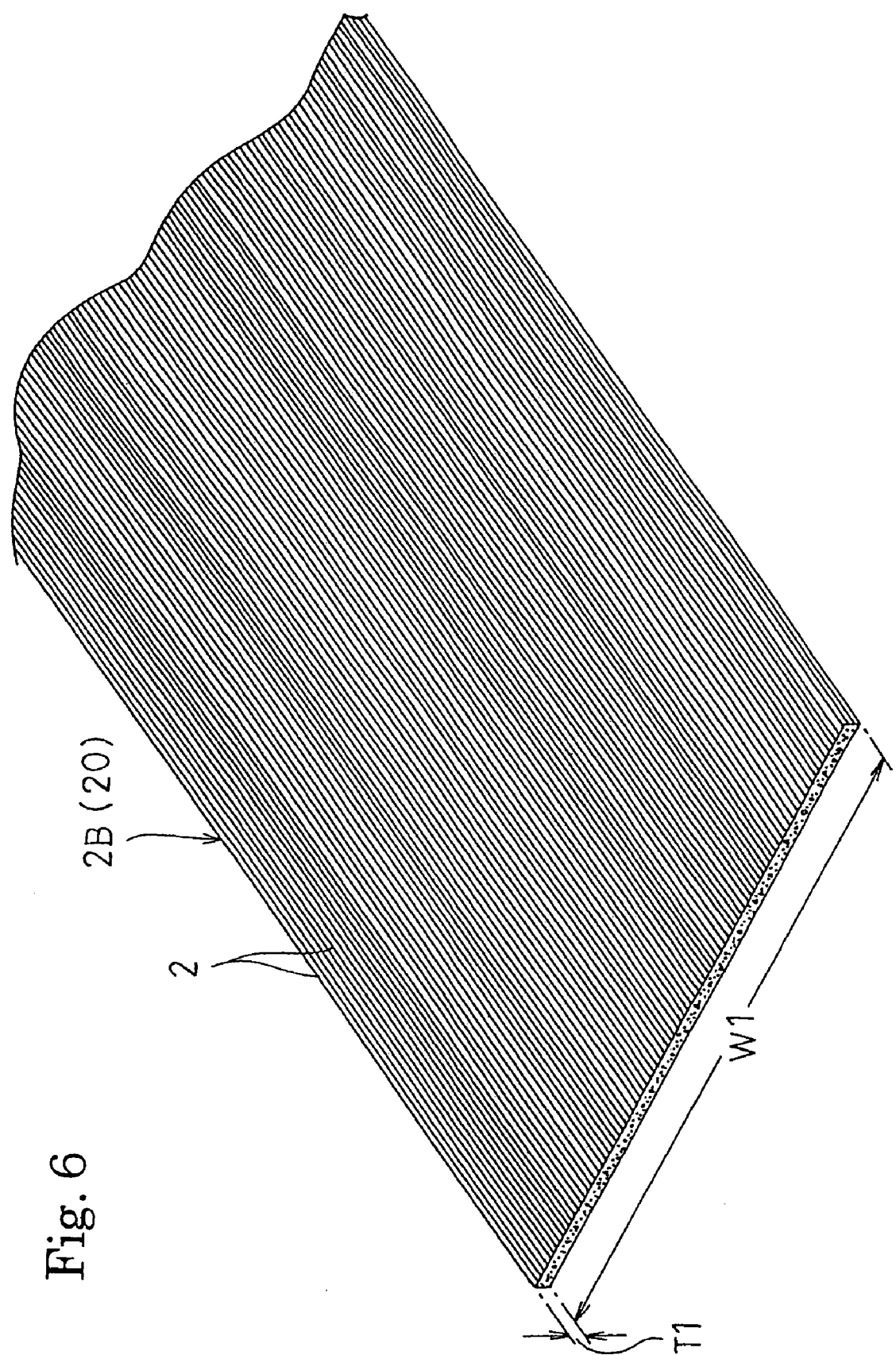

As shown in FIG. 5, initially, a multifilament yarn in which, for example, 12,000 carbon fibers (2) each having a diameter of 7 μm are bundled is used to form a carbon fiber bundle (2A) in which the fibers are bundled in a flat shape having a width (W)=4.00 mm and a thickness (T)=0.20 mm. Then, the carbon fiber bundle (2A) is fiber-opened to a sheet-like shape so as to be extended in the width direction, whereby a fiber-opened sheet (2B) having a width (W1)=25.00 mm and a thickness (T1)=0.03 mm is formed as shown in FIG. 6.

For example, the fiber opening process is conducted in the following manner. First, the carbon fiber bundle (2A) is heated to soften a sizing agent for the fiber bundle, and the carbon fiber bundle (2A) is fed in the longitudinal direction while controlling the speed of the fiber bundle in this state. An air flow is blown in a crossing direction while maintaining a predetermined overfeed amount. In a portion where the air flow passes, the carbon fiber bundle (2A) is arcuately strained to be unbound in the width direction, and the sizing agent is cooled and hardened, thereby forming the extended fiber-opened sheet (2B).

Figure 7:
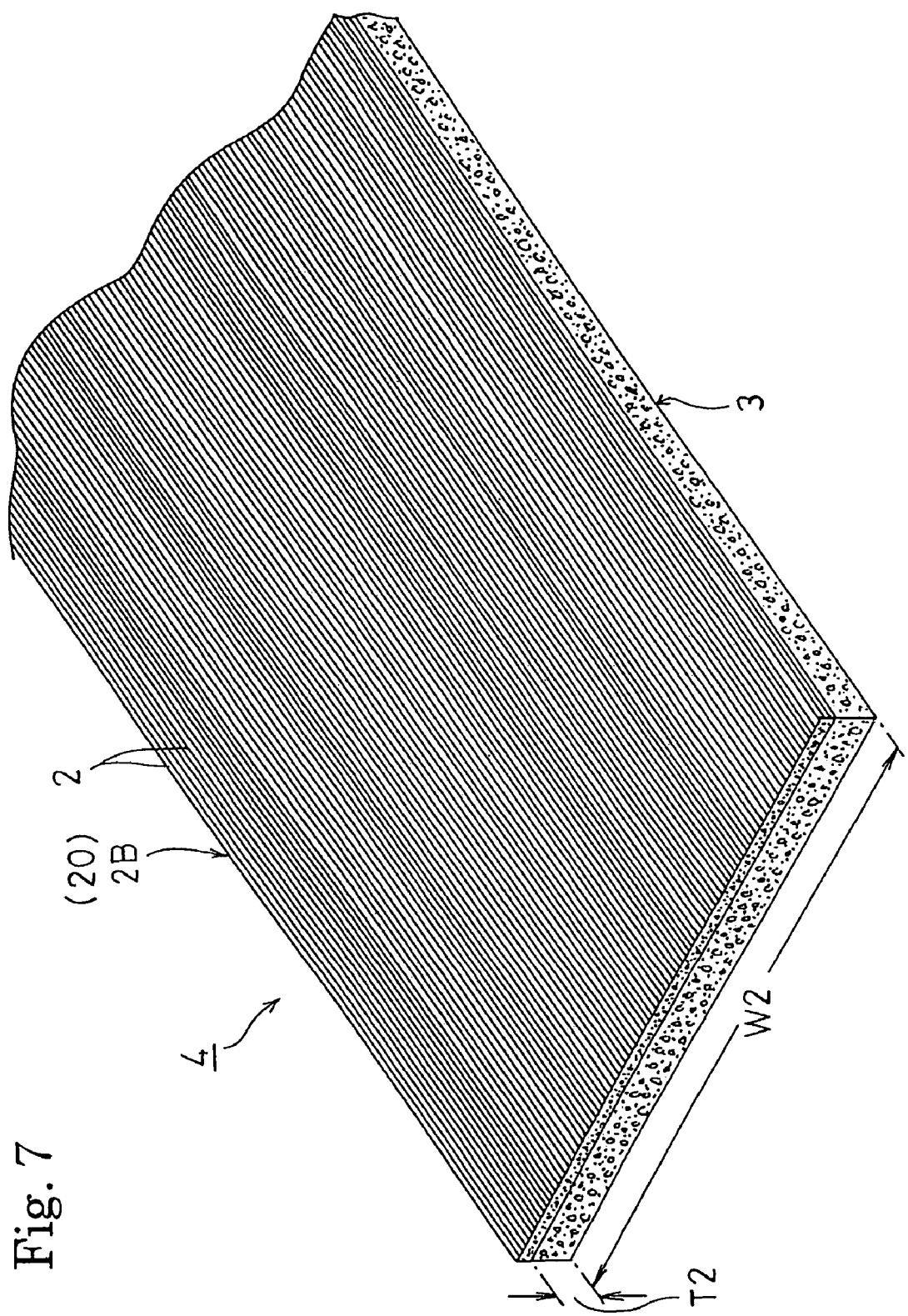

As shown in FIG. 7, next, the fiber-opened sheet (2B) is laid on one face of the strip-like expanded graphite (3) having a width (W2)=25.00 mm and a thickness (T2)=0.25 mm, to form the base member (4) in which the sheet-like reinforcing member (20) configured by the carbon fibers (2) is disposed on one face of the strip-like expanded graphite (3).

Then, the base member (4) is stranded to be formed into the cord-like member (40), thereby producing the gland packing material (1).

Figure 8:
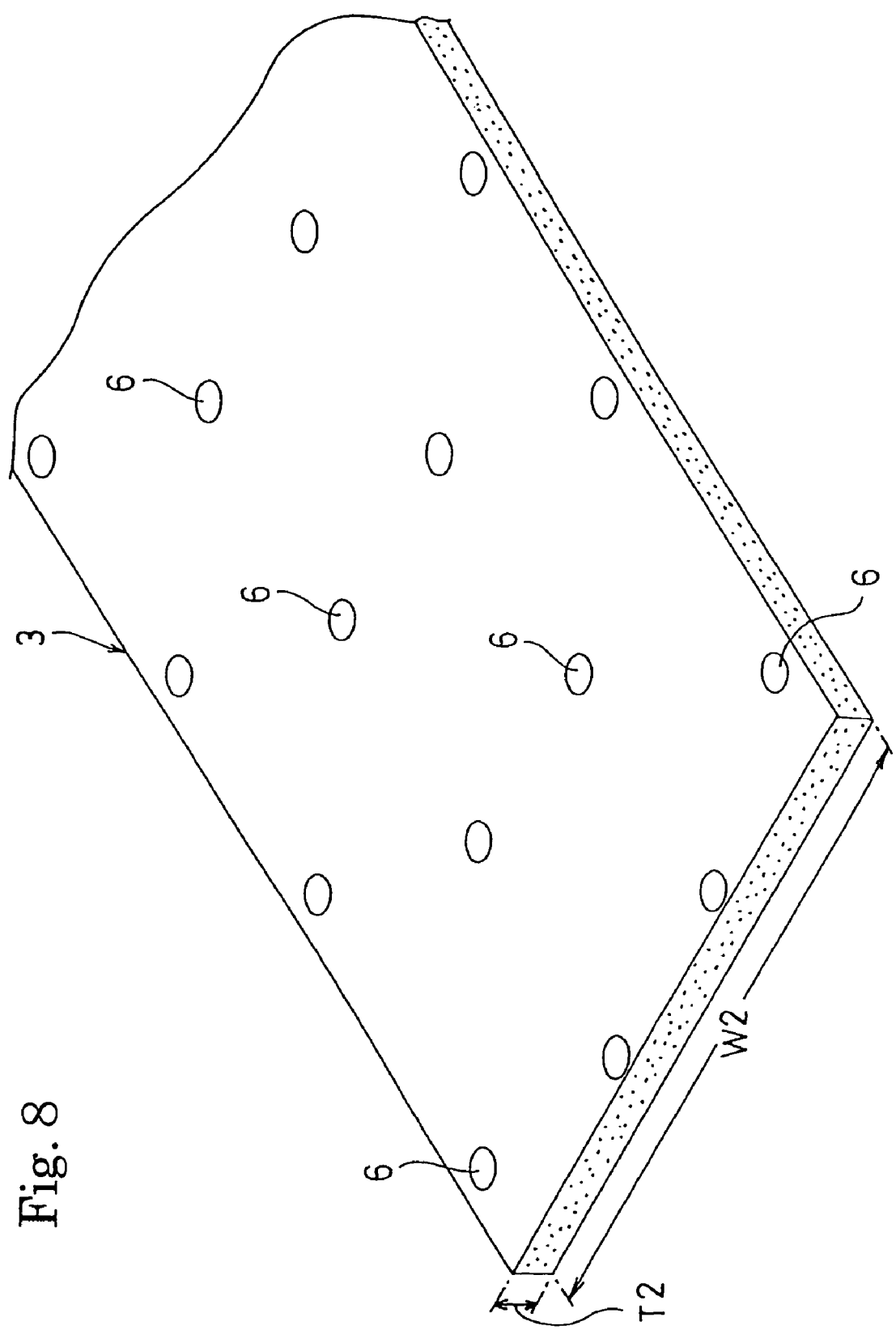

Preferably, an adhesive agent is omitted in the base member (4). However, the coupling force between the reinforcing member (20) and the strip-like expanded graphite (3) may be enhanced by using a small amount of adhesive agent. Specifically, as shown in FIG. 8, for example, an adhesive agent (6) of epoxy resin, acrylic resin, phenol resin, or like resin may be disposed in a spot-like manner on one face of the strip-like expanded graphite (3) having a width (W2)=25.00 mm and a thickness (T2)=0.25 mm, and the fiber-opened sheet (2B) may be laid on one face of the strip-like expanded graphite (3) in this state to form the base member (4). The adhesive agent (6) is used in a spot-like manner so that the used amount is restricted to a very small level. Therefore, the properties of the strip-like expanded graphite (3) such as the affinity and the compression recovery property are prevented from being lowered by hardening of the adhesive agent (6).

Figure 9:
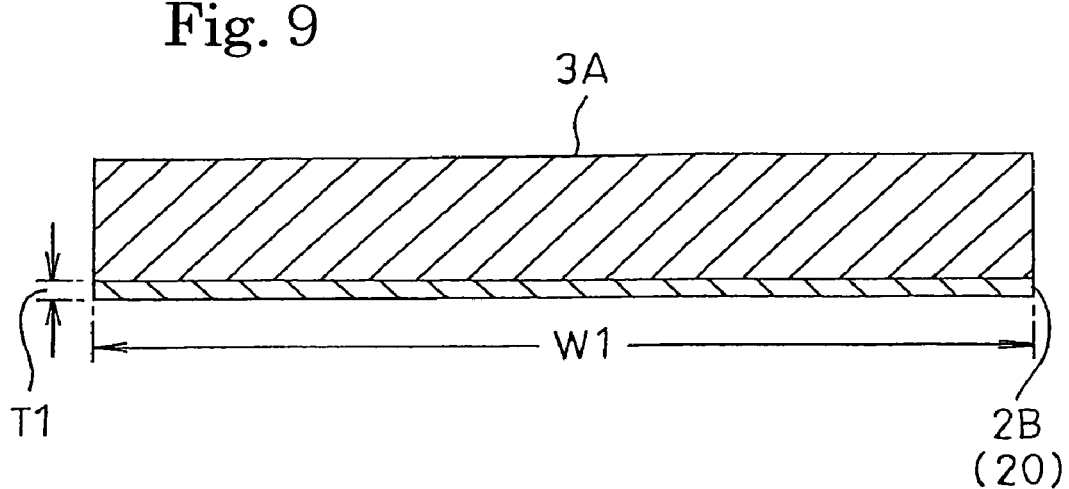
Figure 10:
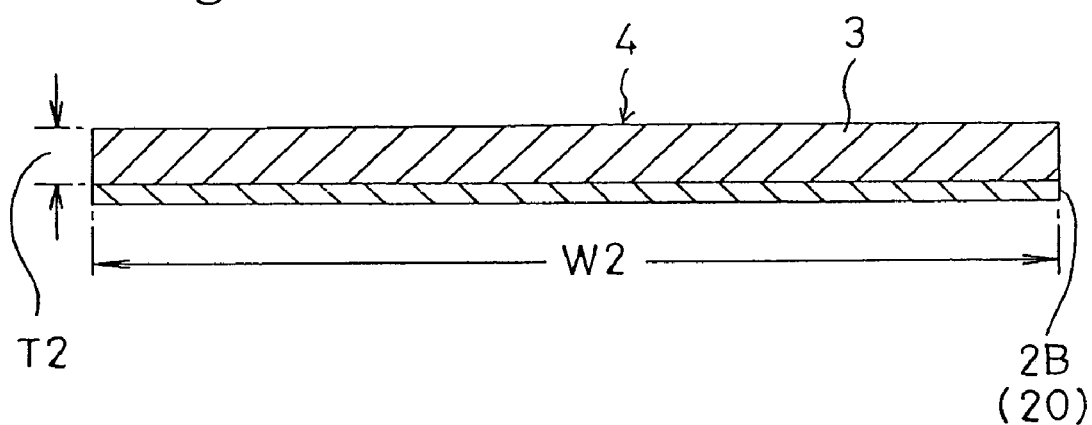

Alternatively, as shown in FIGS. 9 and 10, for example, the base member (4) may be formed by, when expanded graphite powder is to be compression-molded to the strip-like expanded graphite (3), disposing the reinforcing member (20) to be integrated with one face of the strip-like expanded graphite (3). Specifically, as shown in FIG. 9, expanded graphite powder (3A) is superimposed on the fiber-opened sheet (2B) having a width (W1)=25.00 mm and a thickness (T1)=0.03 mm. A compression-molding process is then applied, thereby forming the base member (4) in which, as shown in FIG. 10, the reinforcing member (20) configured by the fiber-opened sheet (2B) is disposed on one face of the strip-like expanded graphite (3) that is compressed so as to have a width (W2)=25.00 mm and a thickness (T2)=0.25 mm.

In the first embodiment, the reinforcing member (20) constituting the base member (4), and the strip-like expanded graphite (3) are formed so as to have the same width. In the invention, alternatively, their widths may be different from each other.

Figure 11:
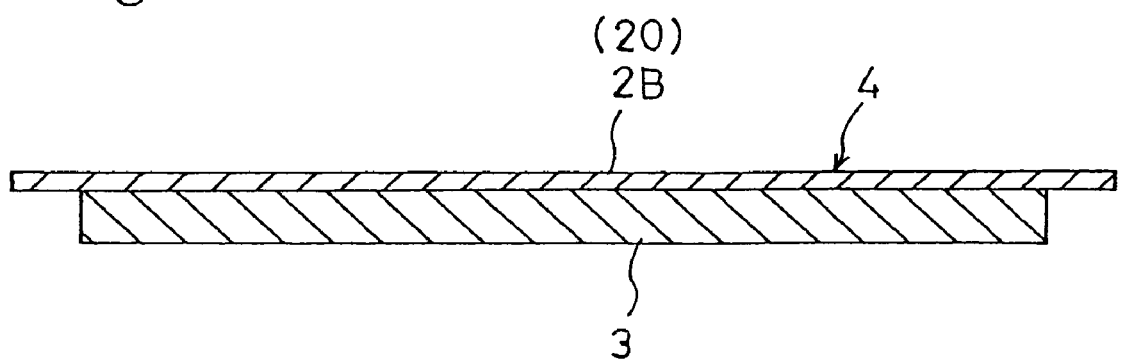

In a first modification shown in FIG. 11, for example, the base member (4) is formed by laying the fiber-opened sheet (2B) which is larger in width than the strip-like expanded graphite (3), on one face of the strip-like expanded graphite (3).

In a second modification shown in FIG. 12, the base member (4) is formed by laying the fiber-opened sheet (2B) which is smaller in width than the strip-like expanded graphite (3), on one face of the strip-like expanded graphite (3). In the second modification, when both end portions in the width direction of the strip-like expanded graphite (3) protrude from the fiber-opened sheet (2B), one of the protruding end portions of the strip-like expanded graphite (3) is exposed to the outside of the cord-like member (40). Among the end portions in the width direction of the strip-like expanded graphite (3), therefore, the end portion which is opposite to one end portion (5) that is to be involved in the cord-like member (40) is preferably aligned with the end portion in the width direction of the fiber-opened sheet (2B) as indicated by the phantom line in FIG. 12.

In a third modification shown in FIG. 13, the base member (4) is formed by laying the strip-like expanded graphite (3) on both faces of a large-width fiber-opened sheet (2B). In this case, when the base member (4) is stranded, one of the strip-like expanded graphites (3) may be exposed to the outside of the cord-like member (40). Therefore, it is preferable to form the one strip-like expanded graphite (3) in a portion close to one end in the width direction of the fiber-opened sheet (2B) so that, when the base member (4) is stranded, the graphite is involved in the cord-like member (40).

It is a matter of course that, in the fibrous material and the strip-like expanded graphite which are used in the invention, the thickness of the fibers, the number of the bundled fibers, the width of the sheet, the thickness of the sheet, the width and thickness of the strip-like expanded graphite, and the like are not restricted to those in the first embodiment described above.

As the carbon fibers (2), however, it is preferable to use fibers each having a diameter of 3 μm to 15 μm. When the diameter is smaller than 3 μm, the fibers may be broken during the stranding process, and, when the diameter is larger than 15 μm, the fibers are hardly stranded. The carbon fibers (2) exert a higher sealing property as their diameter is smaller. Therefore, it is most preferable to set the diameter of the carbon fibers (2) to a range of 5 μm to 9 μm. In the invention, in place of carbon fibers, other brittle fibers, or tough fibers may be used. In the case where tough fibers such as metal fibers are used, such fibers have high bendability, and hence it is less likely that they are broken during the stranding process. In such a case, therefore, thinner fibers may be used.

Moreover, the thickness (T1) of the fiber-opened sheet (2B) is preferably set to a range of 10 μm to 300 μm, and more preferably to a range of 30 μm to 100 μm. When the thickness (T1) is smaller than 10 μm, the external reinforcement effect is reduced, and a uniform sheet is hardly produced. When the thickness (T1) is larger than 300 μm, the external reinforcement effect can be enhanced, but the stranding process is hardly applied and leakage from a reinforcing member portion easily occurs.

FIG. 14 is a perspective view showing a second embodiment of the gland packing material of the invention. The gland packing material (1) of the second embodiment is configured by the cord-like member (40) which, as shown in FIG. 14, is formed by winding the base member (4) that is configured in the same manner as the first embodiment described above, about the longitudinal direction in the state where the reinforcing member (20) configured by the carbon fibers (2) is directed outward. The carbon fibers (2) are placed in parallel with the longitudinal direction of the cord-like member (40). A portion of the reinforcing member (20) configured by the carbon fibers (2) covers the whole outer side of the cord-like member (40), and the remaining portion is placed inside the cord-like member (40).

In the same manner as the first embodiment described above, namely, the portion of the carbon fibers (2) and the one end portion (5) in the width direction of the strip-like expanded graphite (3) are involved in the gland packing material (1), and the one end portion (5) of the strip-like expanded graphite (3) has a sandwich structure in which the range indicated by the region (L) is sandwiched by the reinforcing member (20).

The other configuration is similar to that of the first embodiment, and functions in a similar manner. Therefore, its description is omitted.

When the gland packing material (1) of the second embodiment is stranded in a spiral manner, the material can be formed into the gland packing material (1) having an appearance which is identical with that of the first embodiment. In this case, for example, bent portions are formed in the surface of the cord-like member, and the material can function and attain effects in a similar manner as the first embodiment.

FIGS. 15 and 16 show a third embodiment of the invention.

In both the first and second embodiments described above, the reinforcing member (20) is disposed only on one face of the strip-like expanded graphite (3). By contrast, in the third embodiment, as shown in FIG. 15, the base member (4) is formed by disposing the reinforcing member (20) configured by the fiber-opened sheet (2B) having a width which is equal to that of the strip-like expanded graphite (3), on the both faces of the strip-like expanded graphite (3).

In the same manner as the first embodiment described above, the base member (4) is stranded in the longitudinal direction with starting from an end, whereby the gland packing material (1) configured by the cord-like member (40) is formed as shown in FIG. 16.

In the third embodiment, the reinforcing member (20) configured by the carbon fibers (2) is disposed on the both faces of the strip-like expanded graphite (3). As compared with the first embodiment, therefore, the involved amount of the carbon fibers (2) which is involved in the cord-like member (40) is larger. As a result, the gland packing material (1) is externally reinforced, and further reinforced from the inner side, so that the tensile strength is further improved. Since the reinforcing member (20) configured by the carbon fibers (2) is placed on both the faces of the strip-like expanded graphite (3) and the involved amount of the reinforcing member (20) is increased, movement of expanded graphite particles is suppressed, so that the shape-retaining property is improved. As a result, in a gland packing which is produced by the gland packing material (1), the pressure contact force to be applied to the counter member can be further increased.

The other configuration is similar to that of the first embodiment, and functions in a similar manner. Therefore, its description is omitted.

In the base member (4) used in the third embodiment, in the same manner as the first embodiment described above, the widths of the reinforcing member (20) and the strip-like expanded graphite (3) may be different from each other in a first modification of the third embodiment shown in FIG. 17, namely, the base member (4) is formed by laying the fiber-opened sheets (2B, 2B) which are larger in width than the strip-like expanded graphite (3), respectively on the both faces of the strip-like expanded graphite (3).

In a second modification of the third embodiment shown in FIG. 18, the base member (4) is formed by laying the fiber-opened sheets (2B, 2B) which are smaller in width than the strip-like expanded graphite (3), respectively on the both faces of the strip-like expanded graphite (3).

In the invention, it is a matter of course that, when the reinforcing members (20) are to be disposed on the both faces of the strip-like expanded graphite (3), any combination of two kinds of a large-width reinforcing member, a small-width reinforcing member, and an equal-width reinforcing member can be used.

FIG. 19 is a perspective view showing a fourth embodiment of the gland packing material of the invention. The gland packing material (1) of the fourth embodiment is configured by the cord-like member (40) which is formed by winding the base member (4) that is configured in the same manner as the third embodiment described above, about the longitudinal direction. The carbon fibers (2) are placed in parallel with the longitudinal direction of the cord-like member (40). The other configuration is similar to that of the third embodiment, and functions in a similar manner. Therefore, its description is omitted.

In the embodiments described above, carbon fibers are used as the fibrous material. In the invention, alternatively, other brittle fibers, and tough fibers may be used. Examples of such brittle fibers are glass fibers such as E-glass, T-glass, C-glass, and S-glass, silica fibers, and ceramic fibers such as alumina and alumina-silica. Examples of the tough fibers are metal fibers such as stainless steel, aramid fibers, and PBO fibers.

In the embodiments, a fiber-opened sheet is used as the sheet-like reinforcing member configured by a fibrous material. Alternatively, the reinforcing member configured by a fibrous material which is useful in the invention may be formed into a sheet-like shape by other means.

Next, the gland packing of the invention which is produced with using the gland packing material will be described.

Figure 20:
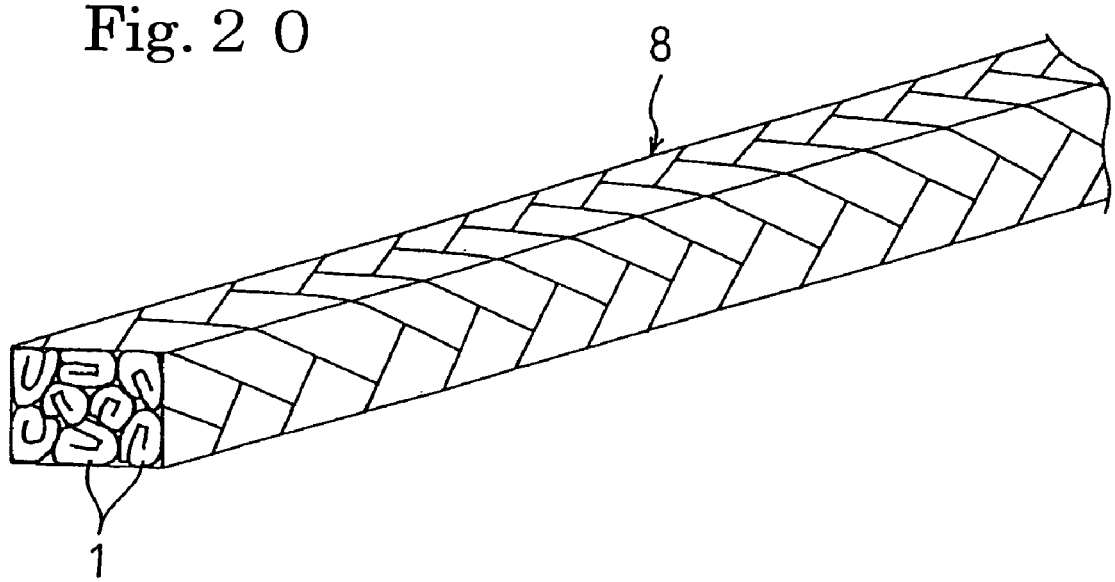

FIG. 20 is a perspective view showing an embodiment of the gland packing of the invention.

The cord-like gland packing (8) is produced by preparing a plurality of the above-described gland packing materials (1) of the invention, and bundling and braiding these gland packing materials (1) by a braiding machine. For example, the gland packing (8) shown in FIG. 20 is produced by conducting an eight-strand square-knitting process on eight gland packing materials (1).

The cord-like gland packing (8) is produced with using a plurality of the above-described gland packing materials (1). Properties which are preferable in sealing, and which are inevitable in a packing, such as the heat resistance, the compressibility, and the recovery property are provided by the strip-like expanded graphite. Moreover, the gland packing material (1) is provided with a high shape-retaining property by the reinforcing member (20), and has a high productivity to be economically provided. Therefore, the cord-like gland packing (8) which is braided with using a plurality of the gland packing materials (1) has excellent shape-retaining and sealing properties, can satisfactorily seal a shaft seal part of a fluid apparatus, and can be economically produced.

In the gland packing material (1), moreover, the used amount of the adhesive agent is zero or a very small amount. Even when the gland packing (8) is used under a high temperature condition, therefore, reduction of the sealing property due to burning of the adhesive agent can be suppressed. Also because of this, the gland packing has an excellent sealing property.

In the case where, as in the above-described embodiments, the gland packing material (1) uses a reinforcing member configured by carbon fibers, or that configured by other brittle fibers, there is no fear that the gland packing (8) forms a large scratch on a counter member, and the sliding resistance is so low that the rotation performance or axial sliding performance of the counter member can be improved, and an excellent heat resistance can be attained.

In the case where the cord-like member (40) is formed by stranding the base member (4), the bent portions (2a) of the fibers are randomly exposed from the surface of the gland packing material (1). In the gland packing (8) which is produced by the gland packing material (1), therefore, the bent portions (2a) are tangled with one another in the braiding to suppress relative slippage of the gland packing material (1). As a result, the shape-retaining property of the gland packing (8) can be enhanced, and the pressure contact force can be increased, so that the sealing property can be improved.

In the case where the cord-like member (40) is formed by winding the base member (4), the bent portions (2a) are not exposed from the surface of the gland packing material (1), but bent portions are formed in carbon fibers or brittle fibers in the braiding. These bent portions are exposed from the surface of the gland packing material (1). As a result, the bent portions (2a) are tangled with one another to suppress relative slippage of the gland packing material (1). Therefore, the shape-retaining property of the gland packing (8) can be enhanced, and the pressure contact force can be increased, so that the sealing property can be improved.

In the case where the gland packing material (1) uses a reinforcing member configured by tough fibers such as metal fibers, such tough fibers have high bendability, and the material hence can cope with not only production of the gland packing (8) having a large diameter, but also that of the gland packing (8) having a small diameter, and can improve the durability.

Figure 21:
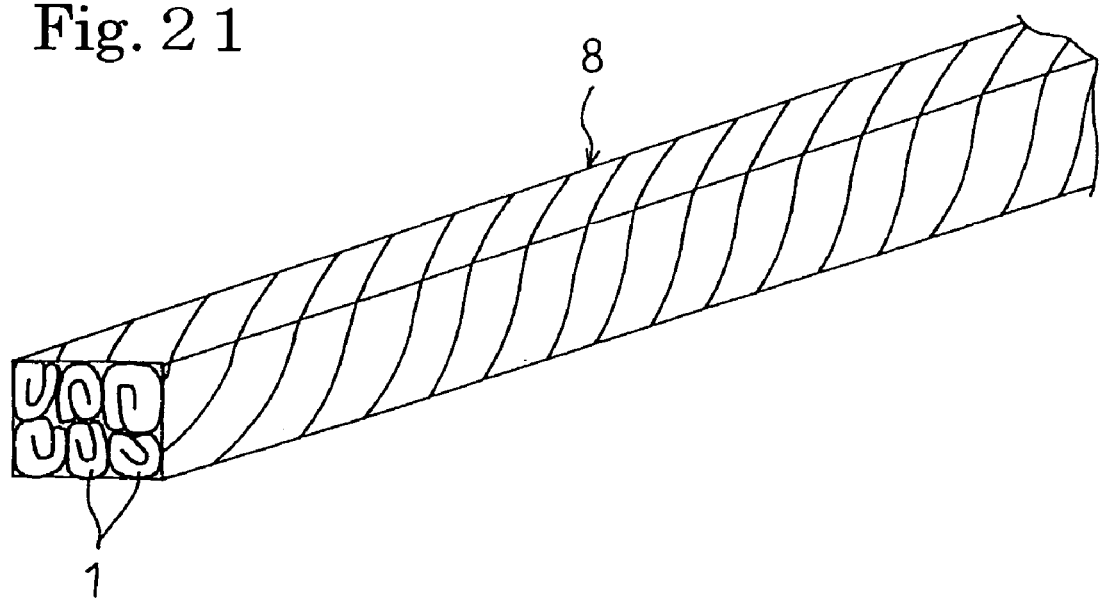
Figure 22:
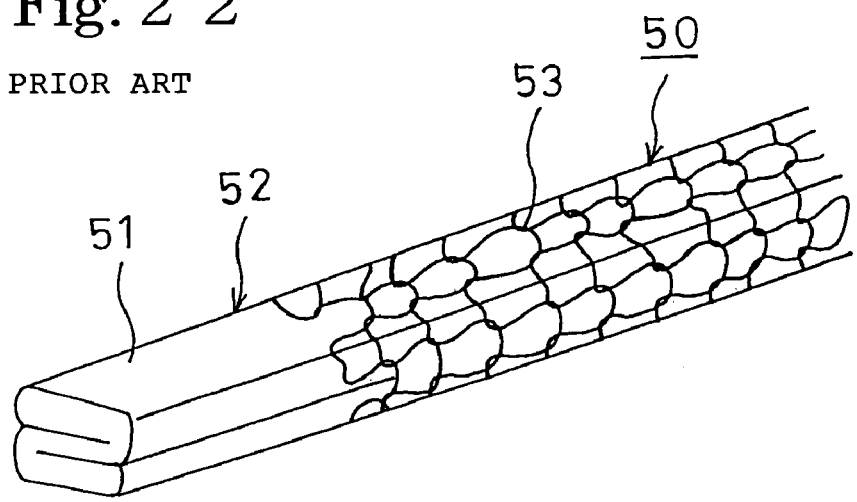
FIGS. 22 to 27 show the conventional art.
Figure 23:
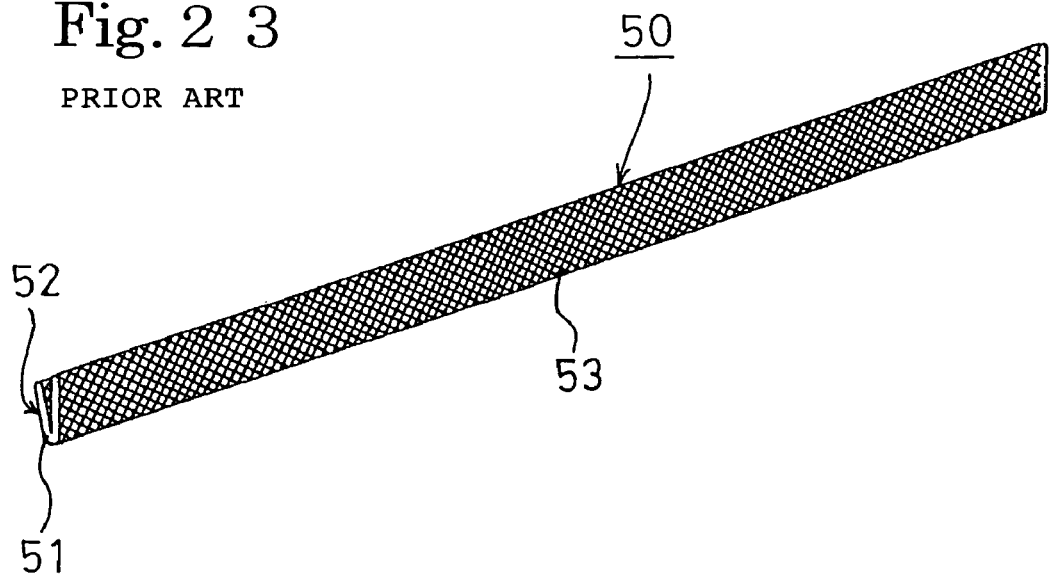
Figure 24:
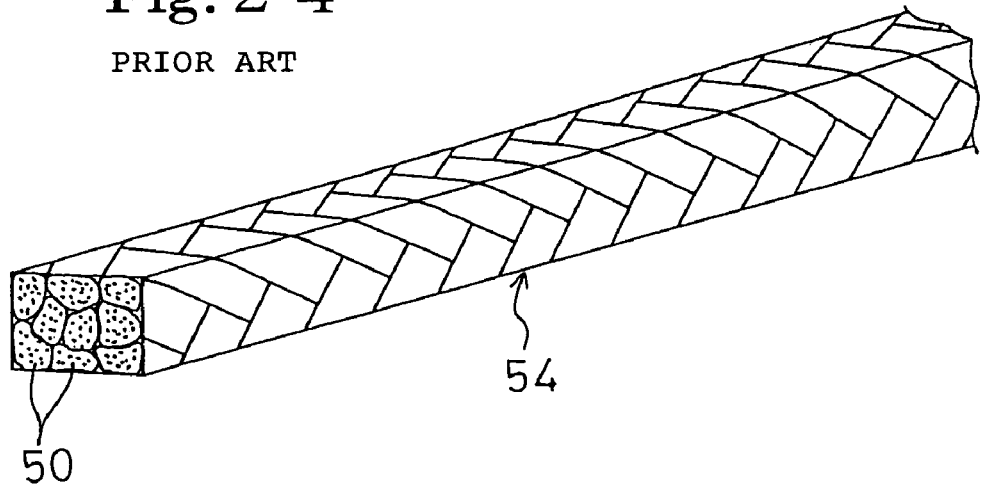
Figure 25:
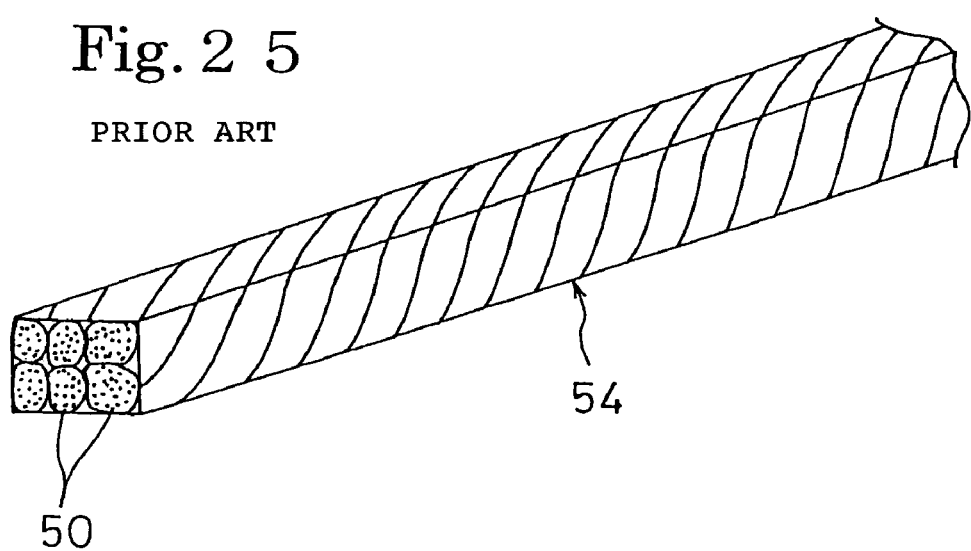
Figure 26:
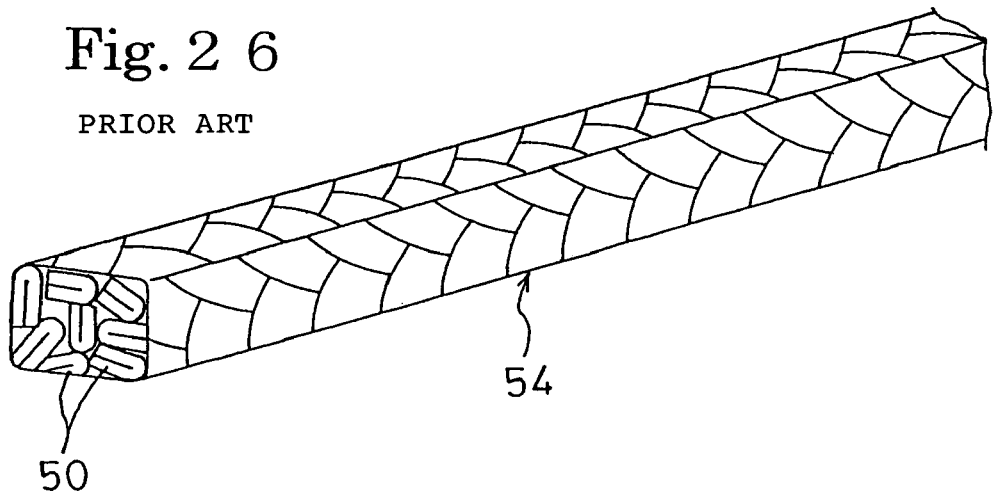
Figure 27:
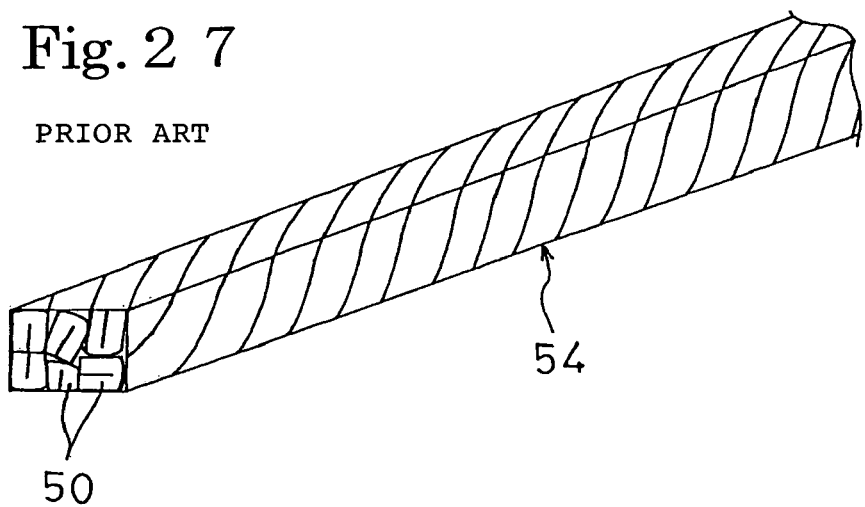

FIG. 21 is a perspective view showing another embodiment of the gland packing of the invention.

In the embodiment, the cord-like gland packing (8) is produced by, in place of braiding gland packing materials (1), bundling and twisting a plurality of gland packing materials (1). For example, the gland packing (8) shown in FIG. 21 is formed by conducting a roll molding process while bundling and applying a twisting process on six gland packing materials (1).

The gland packing (8) of the embodiment functions and attains effects in a similar manner as the embodiment in which the gland packing materials (1) are braided. Therefore, its description is omitted.

The invention claimed is:

1. A gland packing material wherein said gland packing material is configured by a cord-like member (40) which is formed by stranding a strip-like base member (4), or winding a strip-like base member (4) about a longitudinal direction, or winding a strip-like base member (4) about a longitudinal direction and then stranding said base member,
    said base member (4) comprises: a sheet-like reinforcing member (20) configured by a fibrous material (2); and a strip-like expanded graphite (3),
    said reinforcing member (20) is disposed at least on one face of said strip-like expanded graphite (3),
    a portion of said reinforcing member (20) is placed outside said cord-like member (40), a remaining portion is involved in said cord-like member (40),
    a large number of openings (20A) are formed in said reinforcing member (20), and said strip-like expanded graphite (3) faces said openings (20A).

2. A gland packing material according to claim 1, wherein a whole outside of said cord-like member (40) is covered by said portion of said reinforcing member (20).

3. A gland packing material according to claim 1, wherein bent portions (2a) are formed in said fibrous material (2), and said bent portions (2a) are exposed from a surface of said cord-like member (40).

4. A gland packing material according to claim 1, wherein said reinforcing member (20) is disposed only on one face of said strip-like expanded graphite (3).

5. A gland packing material according to claim 1, wherein said reinforcing member (20) is disposed on both faces of said strip-like expanded graphite (3).

6. A gland packing material according to claim 1, wherein said fibrous material (2) is formed into a sheet-like shape, and said fibrous material sheet is configured by a fiber-opened sheet (2B) in which multifilament yarns are opened in a sheet-like shape.

7. A gland packing material according to claim 6, wherein a thickness of said fiber-opened sheet (2B) is set to 10 μm to 300 μm.

8. A gland packing material according to claim 1, wherein said fibrous material (2) is configured by one or two or more selected from the group consisting of carbon fibers and other brittle fibers, and tough fibers.

9. A gland packing material according to claim 8, wherein said brittle fibers are configured by one or two or more selected from the group consisting of glass fibers, silica fibers, and ceramic fibers.

10. A gland packing material according to claim 8, wherein said tough fibers are configured by one or two or more selected from the group consisting of metal fibers, aramid fibers, and PBO fibers.

11. A gland packing wherein a plurality of gland packing materials (1) according to any one of claims 1 to 10 are used, and braided or twisted.

12. A gland packing material according to claim 1, wherein said sheet-like reinforcing member comprises a fiber-opened sheet in which a multifilament yarns are opened.

* * * * *